United States Patent
Kim et al.

(10) Patent No.: US 12,441,184 B2
(45) Date of Patent: Oct. 14, 2025

(54) DISPLAY APPARATUS FOR VEHICLE

(71) Applicant: HYUNDAI MOBIS CO., LTD., Seoul (KR)

(72) Inventors: Shin Yeoung Kim, Yongin-si (KR); Kil Pyung Jang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 204 days.

(21) Appl. No.: 18/365,150

(22) Filed: Aug. 3, 2023

(65) Prior Publication Data
US 2024/0397647 A1    Nov. 28, 2024

(30) Foreign Application Priority Data

May 24, 2023 (KR) .......... 10-2023-0066742

(51) Int. Cl.
*B60K 35/22* (2024.01)
*H05K 5/02* (2006.01)
*B60K 35/53* (2024.01)
*B60K 35/60* (2024.01)

(52) U.S. Cl.
CPC ............ *B60K 35/22* (2024.01); *B60K 35/223* (2024.01); *H05K 5/0217* (2013.01); *B60K 35/53* (2024.01); *B60K 35/60* (2024.01); *B60K 2360/771* (2024.01)

(58) Field of Classification Search
CPC . B32B 7/12; B32B 2255/26; B32B 2307/202; B32B 2307/42; B32B 2307/7376; B32B 2457/20; B32B 3/18; B32B 9/005; B32B 15/04; B32B 2307/412; B32B 15/18; B32B 2307/206; B32B 2307/30; H05K 5/0217; G09F 9/301
See application file for complete search history.

(56) References Cited

U.S. PATENT DOCUMENTS

| | | | | |
|---|---|---|---|---|
| 10,434,847 B2* | 10/2019 | Yoshizumi | ............. | G09G 3/001 |
| 11,127,323 B2* | 9/2021 | Kim | ...................... | G06F 1/1652 |
| 11,576,270 B2* | 2/2023 | Rha | ........................ | G09F 27/005 |
| 12,054,103 B2* | 8/2024 | Jang | ........................ | B60K 35/00 |
| 12,249,259 B2* | 3/2025 | Kim | ........................ | G09F 9/301 |

* cited by examiner

*Primary Examiner* — Imani N Hayman
*Assistant Examiner* — Hung Q Dang
(74) *Attorney, Agent, or Firm* — DLA PIPER LLP US

(57) ABSTRACT

A display apparatus for vehicle comprising: a display panel including a first surface designed to have at least one area that is flexibly deformed and display images and videos and a second surface that is a rear surface of the first surface; a housing installed on a head lining of the vehicle and having an internal space which the display panel is drawn into or out of; a plurality of rollers disposed inside the housing to guide a direction in which the display panel is drawn in or out; a driving unit providing force for the display panel to be drawn in or out; and an arm assembly coupled to at least a portion of the second surface to support the stiffness of the drawn-out display panel.

9 Claims, 5 Drawing Sheets

DISPLAY APPARATUS FOR VEHICLE

CROSS-REFERENCE TO RELATED APPLICATION

The present application claims priority to Patent Application No. 10-2023-0066742, filed on May 24, 2023 in Korea, the entire contents of which are incorporated herein by reference.

TECHNICAL FIELD

The present disclosure relates to a display apparatus for a vehicle.

BACKGROUND

The statements in the present section merely provide background information related to the present disclosure and may not constitute prior art.

A display apparatus for providing various information about the vehicle may be installed inside the vehicle, for example, on a center fascia, a dashboard, or a head lining. Such a display apparatus may provide diverse entertainment contents as well as various information about the vehicle. For example, the display apparatus may play music or videos, may receive terrestrial or satellite broadcasting to display it on the screen, may provide information about the status of the vehicle, weather, news, etc. for a user's convenience, and may serve as a navigation system.

The display apparatus may be in the form of a large-screen to provide various information and entertainment contents. When the display apparatus in the form of a large screen is mounted on a head lining of the vehicle, there is a problem in that it occupies a lot of space inside the vehicle. The driving state of the display apparatus is adjusted by moving the entire module of the display apparatus. For example, when the display apparatus is not in use, the display apparatus is adjusted to be positioned horizontally with a head lining by moving the entire module of the display apparatus. When the display apparatus is in use, the display apparatus is adjusted to be positioned vertically with the head lining by moving the entire module of the display apparatus. When the entire module of the display apparatus is moved, a lot of power is consumed and there is a problem in that it is difficult to provide the angle and arrangement of a display panel as desired by an occupant of the vehicle.

SUMMARY

Accordingly, the main purpose of the present disclosure to solve the aforementioned problems is to provide a display apparatus in the form of a large screen based on a flexible display panel for the sake of securing more space inside the vehicle, minimizing the amount of power consumed by the display apparatus, and providing the angle and arrangement of the display panel more appropriate for an occupant of the vehicle.

An embodiment of the present disclosure provides a display apparatus for a vehicle, comprising: a display panel including a first surface designed to have at least one area that is flexibly deformed and display images and videos and a second surface that is a rear surface of the first surface; a housing installed on a head lining of the vehicle and having an internal space which the display panel is drawn into or out of; a plurality of rollers disposed inside the housing to guide a direction in which the display panel is drawn in or out; a driving unit providing force for the display panel to be drawn in or out; and an arm assembly coupled to at least a portion of the second surface to support the stiffness of the drawn-out display panel.

As described above, according to the embodiments of the present disclosure, it may be possible to provide the display apparatus in the form of a large screen based on a flexible display panel for the sake of securing more space inside the vehicle, minimizing the amount of power consumed by the display apparatus, and providing the angle and arrangement of the display panel more appropriate for an occupant of the vehicle.

DETAILED DESCRIPTION

Figure 1:
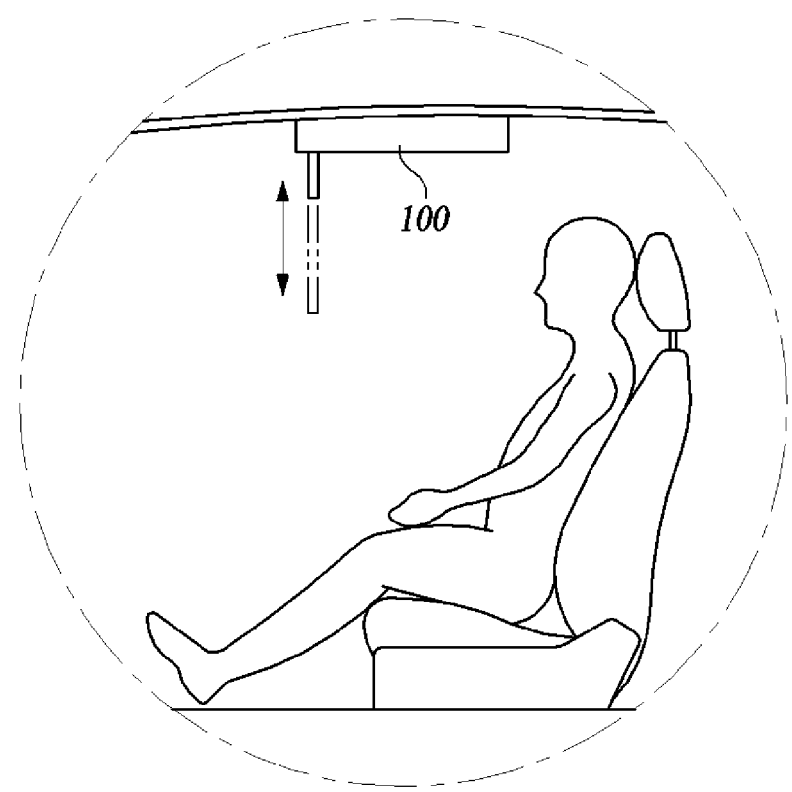
FIG. 1 is a view showing how a display apparatus for a vehicle is installed in a vehicle according to a first embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components.

When a component is described as being 'linked,' 'coupled,' or 'connected' to another component, it should be understood that the component may be directly linked or connected to the other component, and that yet another component may be 'linked,' 'coupled,' or 'connected' between each component.

Throughout the present specification, when a part 'includes' or 'comprises' a component, the part is meant to further include other components, not to exclude thereof unless specifically stated to the contrary.

The terms such as 'unit', 'module', and the like refer to one or more units for processing at least one function or operation, which may be implemented by hardware, software, or a combination thereof.

Unless stated to the contrary, a description of any one embodiment may also be applied to other embodiments.

FIG. 1 is a view showing how a display apparatus for a vehicle is installed in a vehicle according to a first embodiment of the present disclosure.

Figure 2:
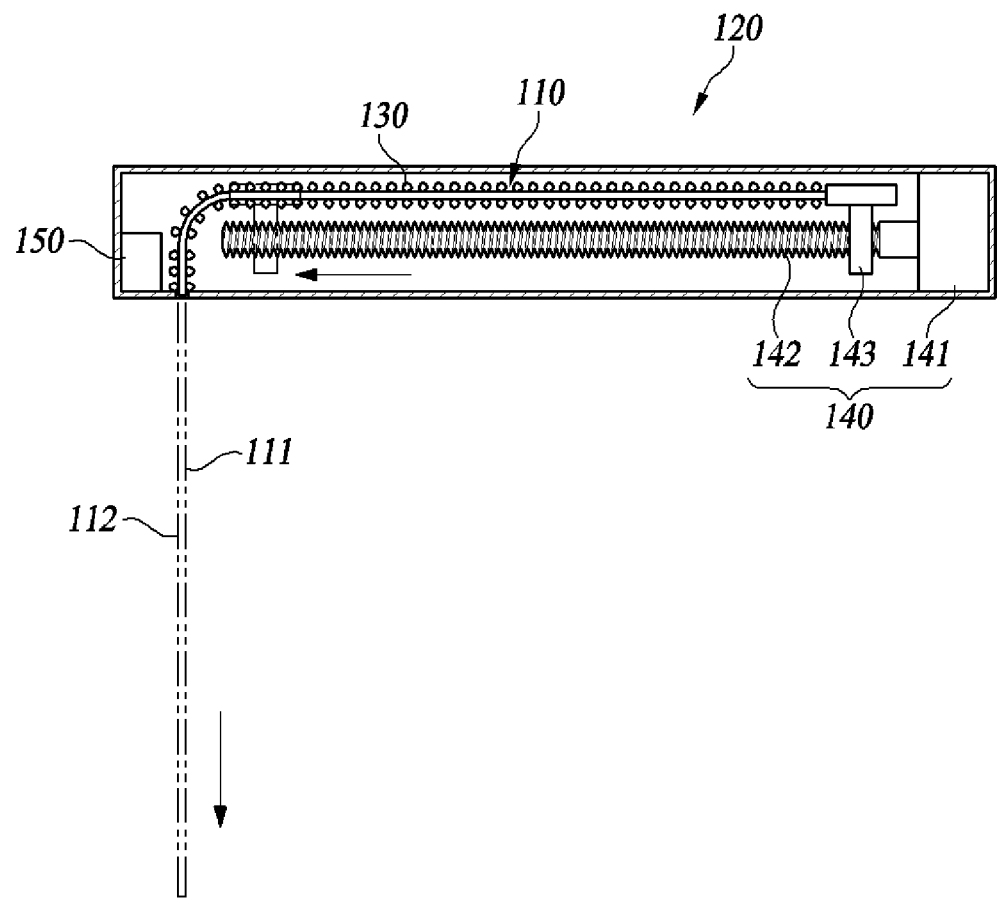
FIG. 2 is a view of an example of the operation of the display apparatus for a vehicle according to the first embodiment of the present disclosure.

FIG. 2 is a view of an example of the operation of the display apparatus for a vehicle according to the first embodiment of the present disclosure.

Figure 5:
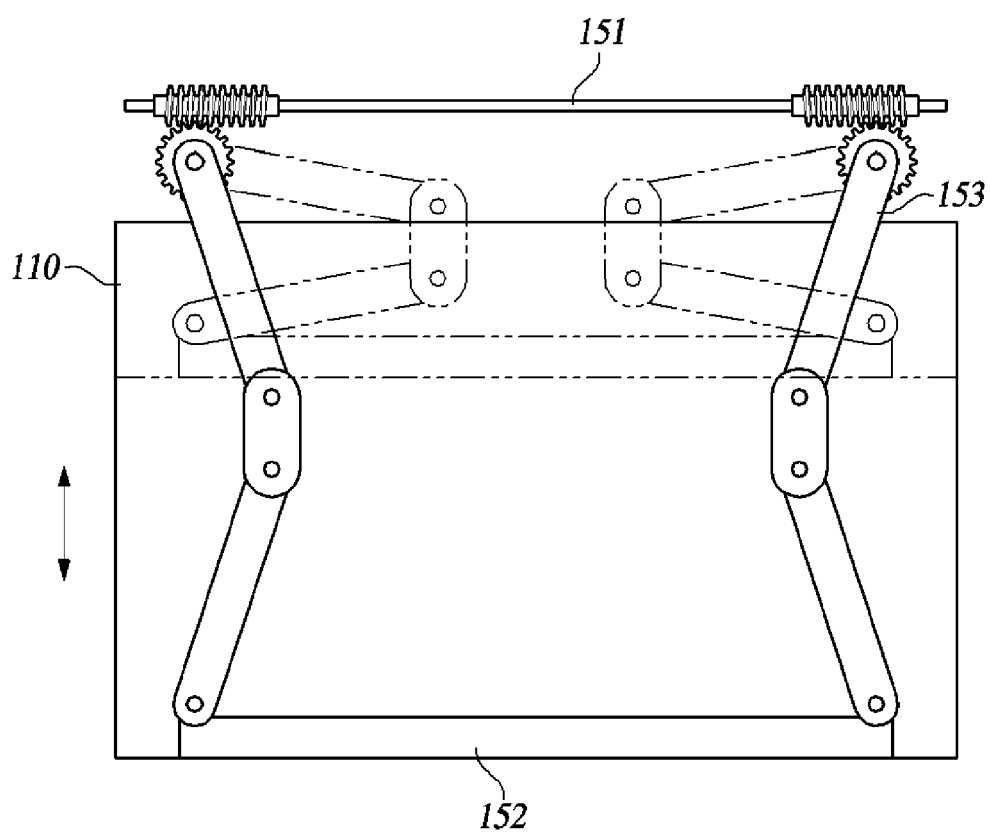
FIG. 5 is a view of an example of the operation of an arm assembly according to the first embodiment of the present disclosure.

FIG. 5 is a view of an example of the operation of an arm assembly according to the first embodiment of the present disclosure.

Referring to FIGS. 1, 2 and 5, the display apparatus for a vehicle 100 according to the first embodiment of the present disclosure may include all or some of a display panel 110, a housing 120, a plurality of rollers 130, a driving unit 140, and an arm assembly 150.

At least one area of the display panel 110 may be formed to be flexibly deformed. The display panel 110 may be formed with elements such as a liquid crystal display (LCD) and an organic light emitting diode (OLED), but is not necessarily limited thereto.

The display panel 110 may be accommodated inside the housing 120 to be drawn out of the housing 120 or drawn into the housing 120. At least one area of the display panel 110 may be disposed substantially parallel to a head lining inside the housing 120. On the other hand, the remaining area of the display panel 110 may be bent from an end of the at least one area of the display panel 110 and disposed substantially perpendicular to the head lining. That is, as shown in FIG. 2, when the display panel 110 is drawn out of the housing 120, it may be bent at least once to be pulled out. The display panel 110 may be drawn vertically downward from the housing 120. Here, "vertically downward" means a direction from top to bottom along the direction of the earth's gravity. Alternatively, the display panel 110 may be drawn out of the housing 120 obliquely.

In the case of the display apparatus for a vehicle 100 according to the first embodiment of the present disclosure, the display panel 110 may be drawn in or out so that its angle and disposition may be adjusted. In the case of the display apparatus for a vehicle 100 according to the first embodiment of the present disclosure, since there is no need to move the heavy entire module of the display apparatus, it may be possible to provide an angle or disposition of viewing videos as desired by an occupant of the vehicle while minimizing power consumption.

There may be several stages of pulling out the display panel 110. The display panel 110 may be drawn out differently depending on content to be displayed, the environment of the vehicle, and the purpose of displaying the content. For example, when an image or video having a resolution of 1,920×1,080 is displayed on the display panel 110, the display panel 110 may be drawn out as much as the image or video having the resolution of 1,920×1,080 can be displayed. When how the display panel 110 is drawn out can be adjusted, a blank space may not be generated at the top or bottom of the display panel 110. The blank space refers to a black area generated at the top and bottom of the screen due to a mismatch between an aspect ratio of a video and the ratio of the display panel 110, and may also be referred to as a letterbox. Because the blank space is the main cause of deteriorating an occupant's immersion in watching a video, it is desirable to remove it. In the case of the display apparatus for a vehicle 100 according to the first embodiment of the present disclosure, it may be possible to improve viewer's immersion by minimizing the blank space.

A video displayed on the display panel 110 may be input by a vehicle occupant, or may be automatically input according to the driving condition of the vehicle.

The display panel 110 may include a first surface 111 designed to display images and videos and a second surface 112 that is a rear surface of the first surface 111. The first surface 111 may display different videos depending on the extent of exposure of the display panel 110. For example, the first surface 111 may display videos of different sizes and resolutions depending on the extent of exposure of the display panel 110. As shown in FIG. 2, when the display panel 110 is drawn into the housing 120, at least a portion of the second surface 112 may be disposed to face the head lining.

The display panel 110 may be designed to be drawn into the housing 120 when it is turned off. Alternatively, the display panel 110 may be designed to be drawn out of the housing 120 when it is turned on.

The display panel 110 may be designed to be turned off at the same time when the engine of the vehicle is turned off and to be turned on at the same time when the engine of the vehicle is turned on, but is not limited thereto. For example, the display panel 110 may be designed to display a video using a battery provided in the vehicle even when the engine of the vehicle is turned off. In this case, the display panel 110 may be designed to turn off the display when a preset time elapses.

The display panel 110 may be designed to be drawn into the housing 120 when an impact to the vehicle is sensed. This is to minimize damage to the display panel 110 and to protect occupants.

The housing 120 may be installed on the head lining. The housing 120 may be designed to move along the head lining inside the vehicle. For example, the housing 120 may be designed to move from the head lining at the front of the vehicle to the head lining at the rear of the vehicle. The housing 120 may have an internal space through which the display panel 110 is drawn in or out. The housing 120 may include a slit through which the display panel 110 is drawn in or out. That is, the display panel 110 may be drawn out of or into the inner space of the housing 120 through the slit. The length of the slit may be equal to or greater than the horizontal length of the display panel 110.

The plurality of rollers 130 may be disposed inside the housing 120 to guide a direction in which the display panel 110 is drawn in or drawn out. Each roller may be fixed inside the housing 120 in the form of a shaft. When the display panel 110 is drawn in or out, each roller may rotate. The plurality of rollers 130 may be disposed in a first row or a second row along a direction in which the display panel 110 is drawn out or drawn in. For example, as shown in FIG. 2, the first row may be in contact with the first surface of the display panel 110, and the second row may be in contact with the second surface of the display panel 110. The display panel 110 may be drawn into or out of the inner space of the housing 120 along the space between the first row and the second row.

The display apparatus for a vehicle according to the first embodiment of the present disclosure may support the display panel 110 drawn into the housing 120 using the plurality of rollers 130 in order to protect the display panel 110 from external impact.

The driving unit 140 may provide force for the display panel 110 to be pulled in or out. The driving unit 140 may be disposed inside the housing 120. The driving unit 140 may include all or some of a motor 141, a shaft 142, and nuts 143.

The motor 141 may be driven using electric power. The motor 141 may be a direct current motor (DC motor), an alternating current motor (AC motor), a servo motor, or a brushless DC motor (BLDC motor).

The shaft 142 may be coupled to the motor 141. The motor 141 may provide rotational force to the shaft 142. The shaft 142 may include a thread on its outer circumferential surface.

The nuts 143 may be coupled to the other end of the display panel 110. Here, the other end of the display panel 110 refers to the end opposite to the portion that is first drawn out when the display panel 110 is drawn out of the housing 120. The nuts 143 may be movable along the longitudinal direction of the shaft 142. The nuts 143 may include a hollow.

The shaft 142 and the nuts 143 may be leadscrews. For example, the nuts 143 may include a thread on an inner circumferential surface of the hollow. The shaft 142 may be inserted into the hollow of the nuts 143. The outer circumferential surface of the shaft 142 and the inner circumferential surface of the nuts 143 may be screwed together. When the shaft 142 rotates, the thread of the nuts 143 and the thread of the shaft 142 may engage with each other and rotate. In this case, the nuts 143 may move along the longitudinal direction of the shaft 142.

The shaft 142 and the nuts 143 may be ballscrews. For example, the nuts 143 may include a plurality of balls on the inner circumferential surface of the hollow. The plurality of balls may be disposed along the thread on the outer circumferential surface of the shaft 142. When the shaft 142 rotates, the plurality of balls may move along the thread of the shaft 142. In this case, the nuts 143 may move along the longitudinal direction of the shaft 142.

Hereinafter, the operating process of the driving unit 140 will be described with reference to FIG. 2. The motor 141 may be driven based on electric power. As the motor 141 is driven, the shaft 142 coupled to the motor 141 may rotate. As the shaft 142 rotates, the nuts 143 may linearly move along the length of the shaft 142. The linear movement of the nuts 143 may allow the display panel 110 to be drawn into or out of the inner space of the housing 120.

In the display apparatus for a vehicle according to the first embodiment of the present disclosure, the display panel 110 may be moved by the driving unit 140 having a simple structure, so that it may be possible to reduce the overall volume of the display apparatus. As the overall volume of the display apparatus is reduced, the space occupied by the display apparatus inside the vehicle may be reduced.

The arm assembly 150 may be coupled to at least a portion of the second surface 112 of the display panel 110 to support the stiffness of the drawn-out display panel 110. The arm assembly 150 may be disposed inside the housing 120. The arm assembly 150 may guide a direction in which the drawn-out display panel 110 of the housing 120 is drawn in or out. The arm assembly 150 may include all or some of a rotating unit 151, a fixing unit 152, and an arm array 153.

The rotating unit 151 may include a worm shaft and a worm wheel. As shown in FIG. 5, the worm shaft may include a thread on at least a portion of its outer circumferential surface. The worm wheel may be designed to engage with the thread of the worm shaft. The worm wheel may be fixed to at least a part of the arm array 153. However, unlike what is shown in FIG. 5, the worm shaft may include a thread on the outer circumferential surface of the entire shaft, and the worm wheel may have an arc shape.

The fixing unit 152 may be coupled to one end of the display panel 110. Here, the one end of the display panel 110 means an end opposite to the other end of the display panel 110. In other words, the one end of the display panel 110 refers to a portion that is first drawn out when the display panel 110 is drawn out of the housing 120. The fixing unit 152 may be coupled to the one end of the display panel 110 using adhesives. Alternatively, the fixing unit 152 may be coupled to the one end of the display panel 110 using screws, rivets, pins, welding, etc.

The arm array 153 may include at least one hinge and a plurality of arms. The plurality of arms may be interconnected by the at least one hinge. The arm array 153 may be designed to be folded or unfolded using the plurality of arms and the at least one hinge. At least some of the arms of the arm array 153 may be coupled to the fixing unit using by the hinge.

Hereinafter, the operation process of the arm assembly 150 will be described with reference to FIG. 5. When the display panel 110 is moved by the driving unit 140, the fixing unit 152 may move simultaneously with the display panel 110. For example, when the display panel 110 is drawn vertically downward, the fixing unit 152 may move vertically downward at the same time. The arm array 153 may be folded or unfolded by the at least one hinge and the plurality of arms as the fixing unit 152 moves. As the arm array 153 is folded or unfolded, the arm fixed to the worm wheel may rotate around the center of the worm wheel as an axis. As the arm fixed to the worm wheel rotates, the worm wheel may also rotate, so that the worm shaft may engage with the worm wheel and rotate.

The operation process of the arm assembly 150 is not limited to what has been described above. For example, the worm shaft may be connected to the motor. As the arm assembly 150 may be folded or unfolded by driving the motor, it may provide force for the display panel 110 to be drawn in or out.

The display apparatus for a vehicle according to the first embodiment of the present disclosure may support the stiffness of the drawn-out display panel 110 using the arm assembly 150. For example, the arm assembly 150 may prevent the drawn-out display panel 110 from being deformed by an external force.

Figure 3:
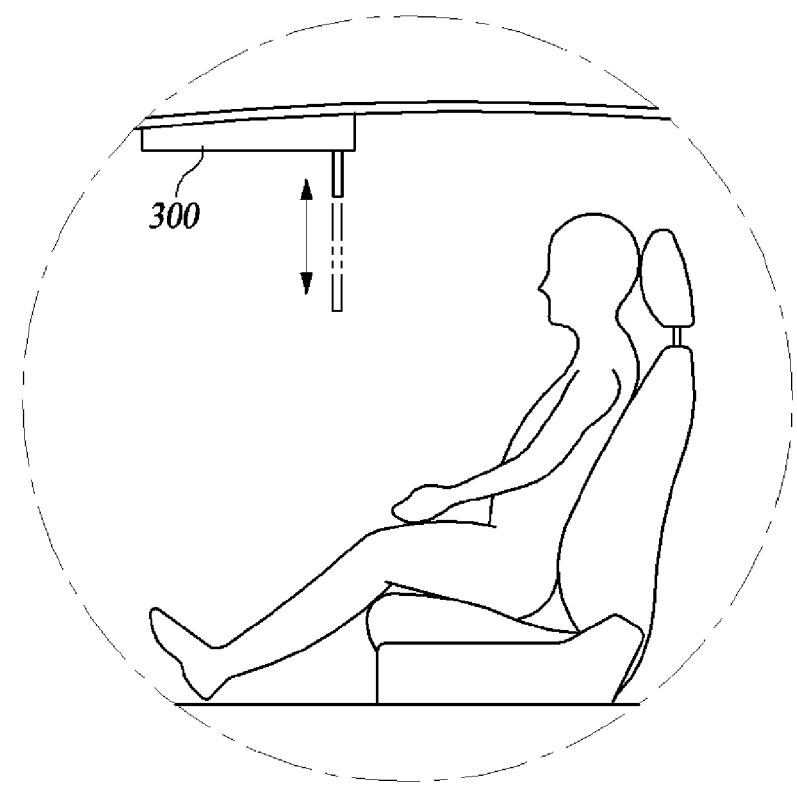
FIG. 3 is a view showing how a display apparatus for a vehicle is installed in a vehicle according to a second embodiment of the present disclosure.

FIG. 3 is a view showing how a display apparatus for a vehicle is installed in a vehicle according to a second embodiment of the present disclosure.

Figure 4:
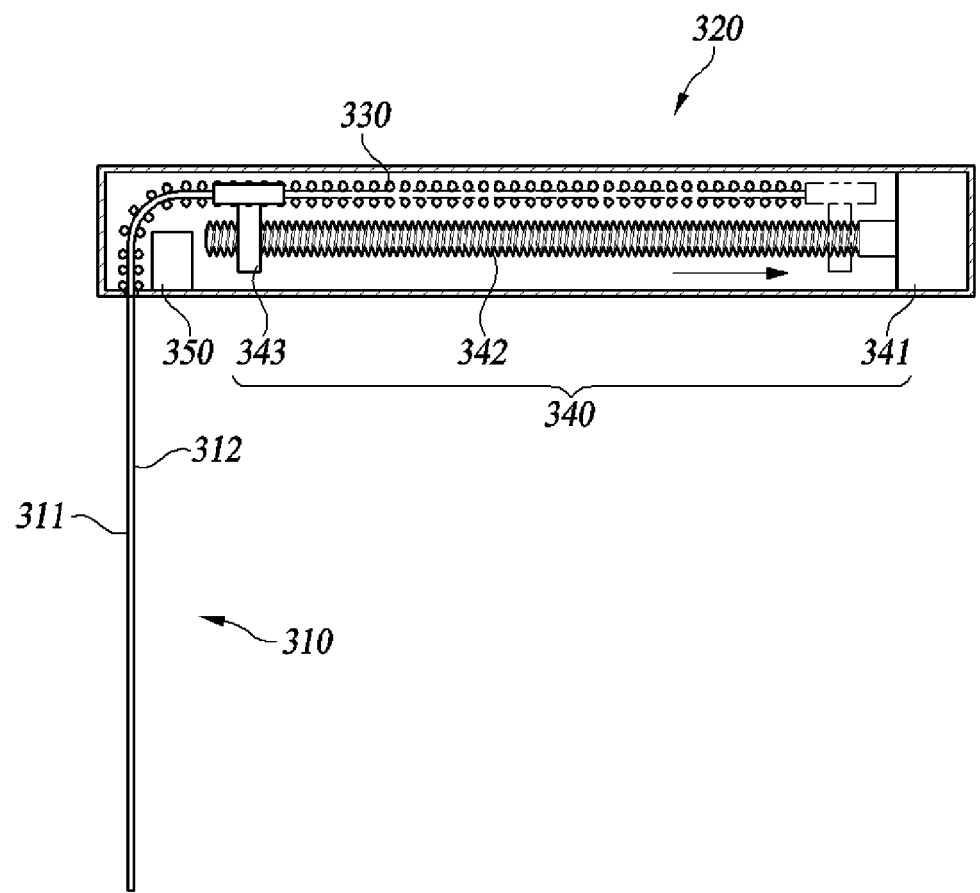
FIG. 4 is a view of an example of the operation of the display apparatus for a vehicle according to the second embodiment of the present disclosure.

FIG. 4 is a view of an example of the operation of the display apparatus for a vehicle according to the second embodiment of the present disclosure.

Referring to FIGS. 3 and 4, the display apparatus for a vehicle 300 according to the second embodiment of the present disclosure may include all or some of a display panel 310, a housing 320, a plurality of rollers 330, a driving unit 340, and an arm assembly 350.

The components according to the second embodiment of the present disclosure may be the same as those according to the first embodiment except for the components specifically described below, so detailed descriptions of the same components will not be repeated.

The display panel 310 according to the second embodiment of the present disclosure may be disposed in a direction opposite to the direction in which the display panel 110 according to the first embodiment of the present disclosure is disposed. For example, the display panel 110 according to the first embodiment may be disposed with its second surface 112 facing the head lining, but the display panel 310 according to the second embodiment may be disposed with its first surface 311 facing the head lining. Accordingly, the housing 120 according to the first embodiment of the present disclosure may be installed close to the rear portion of the vehicle. On the other hand, the housing 320 according to the second embodiment of the present disclosure may be installed close to the front portion of the vehicle. Therefore, even though the housings 120 and 320 may be installed in different locations, the display panels 110 and 310 according to the first and second embodiments of the present disclosure may display images and videos in a direction from the front to the rear of the vehicle.

The structure, shape, and size of a head lining are different for each type of vehicle. Accordingly, based on the structure, shape, and size of a head lining, the display apparatus for a vehicle 100 according to the first embodiment of the present disclosure or the display apparatus for a vehicle 300 according to the second embodiment of the present disclosure can be selected to be installed. For example, when the space of the front portion of the head lining is larger than the space of the rear portion of the head lining, the display apparatus for a vehicle 300 according to the second embodiment may be installed. In contrast, when the space of the rear portion of the head lining is larger than the space of the front portion of the head lining, the display apparatus for a vehicle 100 according to the first embodiment may be installed.

Although exemplary embodiments of the present disclosure have been described for illustrative purposes, those having ordinary skill in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A display apparatus for a vehicle, the apparatus comprising:
    a display panel comprising a first surface configured to have at least one area that is flexibly deformed and display images and videos and a second surface that is a rear surface of the first surface;
    a housing configured to be installed on a head lining of the vehicle and having an internal space for which the display panel is drawn into or out of;
    a plurality of rollers disposed inside the housing and configured to guide a direction in which the display panel is drawn in or out;
    a driving unit configured to provide force for the display panel to be drawn in or out; and
    an arm assembly coupled to at least a portion of the second surface to support the stiffness of the display panel when drawn-out, wherein the arm assembly comprises a rotating unit disposed inside the housing and comprising a worm shaft and a worm wheel, a fixing unit coupled to one end of the display panel, and an arm array configured to connect the rotating unit and the fixing unit and to be folded or unfolded by a hinge.

2. The display apparatus of claim 1, wherein the display panel is drawn vertically downward from the housing.

3. The display apparatus of claim 1, wherein the driving unit comprises a motor, a shaft coupled to the motor to rotate and comprising a thread on its outer circumferential surface, and nuts coupled to an end of the display panel and moving along the longitudinal direction of the shaft.

4. The display apparatus of claim 3, wherein the shaft and the nuts are leadscrews.

5. The display apparatus of claim 3, wherein the shaft and the nuts are ballscrews.

6. The display apparatus of claim 1, wherein the plurality of rollers are arranged in a first row and a second row along a direction in which the display panel is drawn in or out, and the display panel is drawn in or out along the space between the first row and the second row.

7. The display apparatus of claim 1, wherein the display panel is bent at least once in the internal space to be drawn out of the internal space.

8. The display apparatus of claim 1, wherein the display panel is disposed with at least a portion of the first surface facing the head lining when the display panel is drawn into the housing.

9. The display apparatus of claim 1, wherein the display panel is disposed with at least a portion of the second surface facing the head lining when the display panel is drawn into the housing.

* * * * *